United States Patent [19]

Denker

[11] 4,004,963
[45] Jan. 25, 1977

[54] BAND WHEELS AND DRIVE THEREFOR IN BAND SEALER

[75] Inventor: Stanley D. Denker, New Richmond, Wis.

[73] Assignee: Domain Industries, Inc., New Richmond, Wis.

[22] Filed: Dec. 3, 1975

[21] Appl. No.: 637,293

[52] U.S. Cl. ............................................. 156/583
[51] Int. Cl.² ...................................... B32B 31/00
[58] Field of Search ........................... 156/582, 583

[56] References Cited

UNITED STATES PATENTS

| | | | |
|---|---|---|---|
| 2,566,799 | 9/1951 | Humphrey | 156/583 |
| 2,743,762 | 5/1956 | Reitzes | 156/582 |
| 3,218,961 | 11/1965 | Kraft et al. | 156/583 |
| 3,326,735 | 6/1967 | Beason, Jr. | 156/583 |
| 3,475,257 | 10/1969 | Ludwig et al. | 156/583 |

*Primary Examiner*—Douglas J. Drummond
*Attorney, Agent, or Firm*—H. Dale Palmatier

[57] ABSTRACT

A band sealer for sealing thermoplastic bags including superposed endless heat transfer bands and conveyor chains with adjacent bag-engaging and return runs immediately above rigid frame plates, a motor connected by chain driven and meshed pinions driving the conveyor chains, the sealing bands driven from band wheels overlying the chains, mounting brackets beneath the wheels with upstanding stub shafts upon which the wheels are journaled, each band wheel having a ring gear meshed with a pinion beneath the wheel and a sprocket coaxial with the pinion and meshed with the adjacent chain for driving the wheel.

4 Claims, 5 Drawing Figures

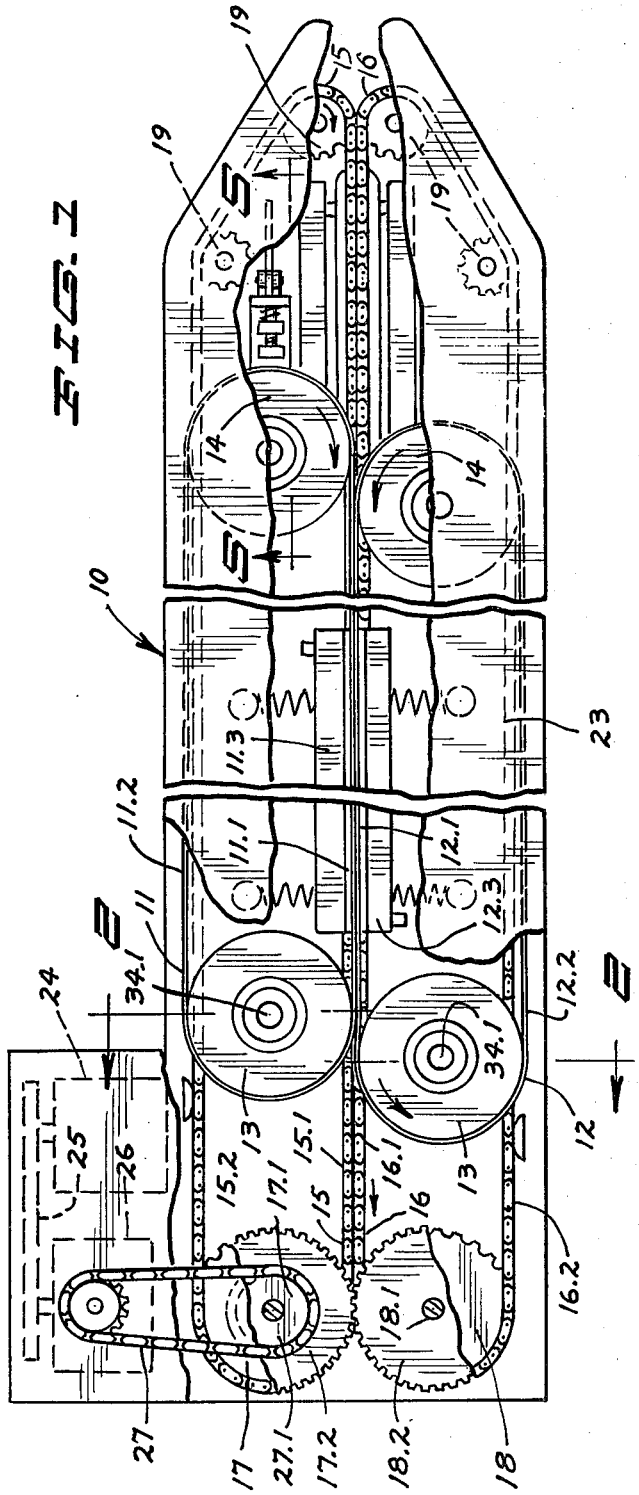
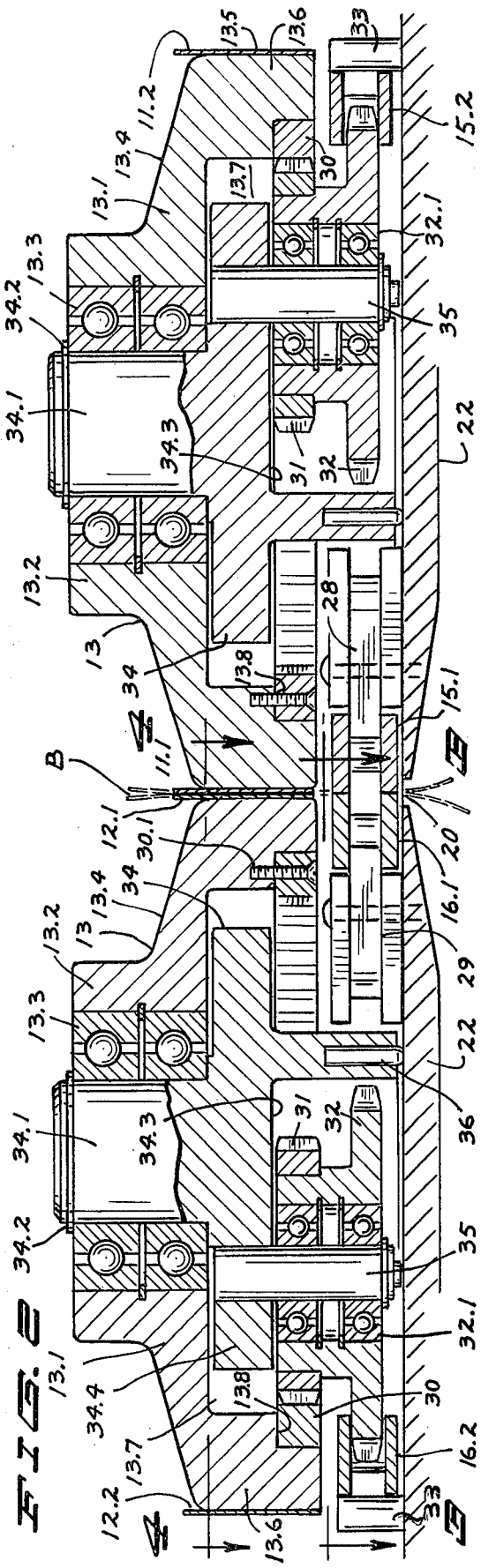

BAND WHEELS AND DRIVE THEREFOR IN BAND SEALER

BACKGROUND OF THE INVENTION

Closing of bags of thermoplastic material, such as polyethylene, is commonly accomplished by sealing the confronting bag side walls together. Such sealing is commonly done by a band sealer which carries the bag between confronting runs of adjacent endless sealing bands of steel or similar material. Heat is transmitted through such bands to the bags for accomplishing sealing, and similarly, heat is withdrawn from the polyethylene through the bands subsequent to the sealing.

In order to properly control and propel the bag along the sealing bands, confronting runs of chains are located immediately beneath the bands and are used to grip and convey the bag along the sealing bands.

The bands and chains are driven from a single motor and the speed of the confronting and adjacent runs of bands and chains must be carefully controlled in order that there is no speed differential between various portions of the bag. If such speed differential occurred between any of the bands or chains, deformation of the bag by tearing or stretching would occur, and this would disrupt the sealing process.

The area beneath the chains and bands must be completely unobstructed so that the bags can freely pass through this space. Because of this need for obstruction-free space beneath the bands and chains, the driving mechanism for the bands and chains has been located above the bands and chains.

It has been common practice to drive the sealing bands by applying driving power to the end wheel about which the bands are trained. Each of these wheels have been driven by a shaft extending downwardly to the respective wheels from pinions which carefully coordinate the speed of the two wheels and confronting bands. Similarly, the bag-carrying chains are driven by sprockets at one end of the chains and the speed of such sprockets is coordinated with respect to each other by meshed pinions on the drive shaft of the respective sprockets. The power from the motor is supplied to these several shafts by additional chains and sprockets.

Because the sealing bands are subjected to heating to sealing temperatures and rapid movement around the wheels, warpage and breakage of such bands occurs from time to time, necessitating replacement of the bands. Replacement of such bands has been accomplished only by complete removal of the band wheel mounting and driving shafts, which necessarily involves the work of a mechanic in disassembling and reassembling parts of the machine, and of course the subsequent realignment.

BRIEF SUMMARY OF THE INVENTION

In the band sealer, the band mounting and driving wheels are mounted on short stub shafts so that the endless bands can be slipped down onto the wheels over the ends of such stub shafts. The band mounting and driving wheels are driven from the adjacent bag-carrying chain which travel along the bands and underlie the band wheels.

Accordingly, the band wheels are hollowed out to mount ring gears which mesh with pinions driven by coaxial sprockets which are driven by the bag-carrying chains.

BRIEF DESCRIPTION OF THE DRAWINGS

FIG. 1 is a top plan view of the chain band sealer.

FIG. 2 is an enlarged detail section view taken along a broken line as indicated at 2—2 in FIG. 1.

DETAILED SPECIFICATION

Figure 3:
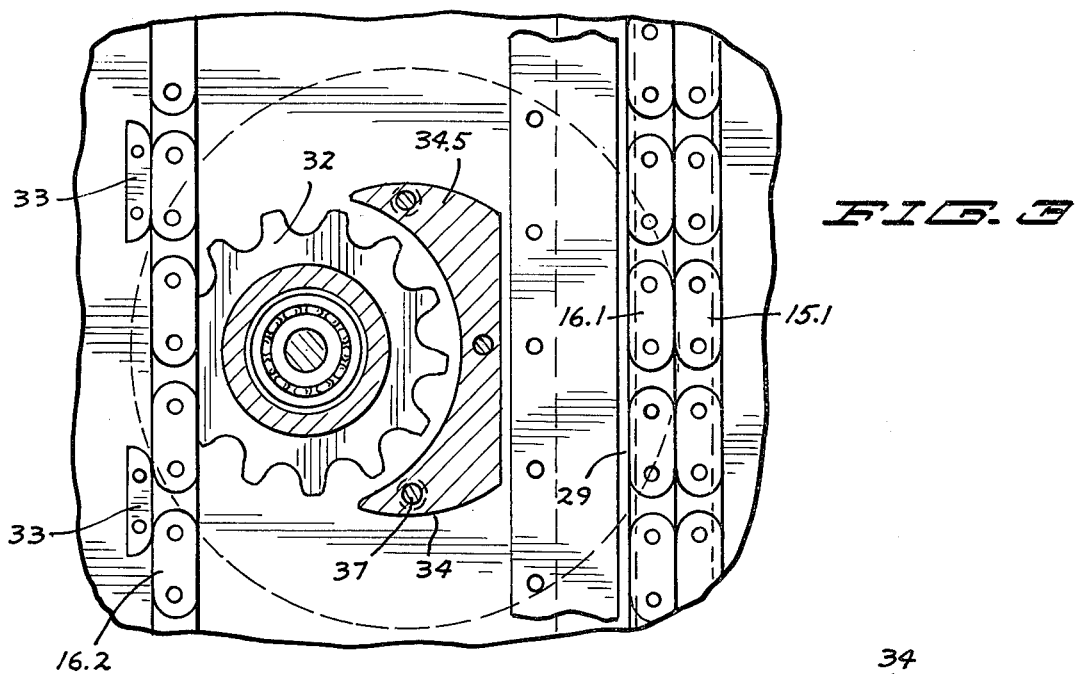
FIG. 3 is a detail section view taken approximately at 3—3 in FIG. 2.

One form of the invention is illustrated in the drawings and is described herein. The band sealer is indicated in general by numeral 10 and includes one or more pair of endless heat transfer bands 11 and 12 arranged to have confronting and closely spaced heat transfer runs 11.1 and 12.1 for engaging and transferring sealing heat into and from the bag tops B which are passed therebetween. The top of such a bag is illustrated in FIG. 2 to show the general arrangement. Of course, each of the bands 11 and 12 has a return run 11.2 and 12.2 also. The bands 11 and 12 are mounted on wheels 13 and 14.

A pair of endless conveyor chains 15 and 16, which are somewhat longer than the bands 11 and 12, are arranged beneath the bands so as to define a pair of confronting and cooperating conveyor runs 15.1 and 16.1 beneath the heat transfer runs 11.1 and 12.1, respectively, for engaging, gripping and carrying the bags through the sealing machine 10. The endless chains 15 and 16 also have return runs 15.2 and 16.2 which also underlie the respective wheels 13 and 14 and the return runs of the bands. Chains 15 and 16 are mounted on and driven by sprockets 17 and 18, and are also mounted and guided by idler sprockets 19.

The superposed bag-engaging runs 11.1 and 12.1 of the bands and the conveyor runs 15.1 and 16.1 of the chains are disposed above a continuous slot 20 extending throughout the length of the machine between a pair of rigid and horizontal frame plates 21 and 22. The frame plates 21 and 22 have enclosing framework and housing in superposed and enclosing relation of the bands, wheels, chains, and sprockets, and indicated in general by numeral 23.

The sprockets 19 are suitably mounted on the frame plates 22, and the sprockets 17 and 18 are affixed on shafts 17.1 and 18.1 which are journaled in bearings on the frame plates and overhead frame structure 23.

Power is supplied from a motor 24 through a chain and sprocket drive 25, a speed-reducing gearbox 26 and a chain and sprocket drive 27 which supplies rotary motion to the shaft 17.1 from sprocket 27.1. Meshed pinions 17.2 and 18.2 on shafts 17.1 and 18.1 coordinate the relative speeds and motion of chains 15 and 16.

Stationary chain guides 28 are affixed on one of the frame plates 22 and extend along the conveyor run 15.1 of the chain 15 to retain the chain in predetermined relation to the slot 20 between the frame plates. A yieldable or slightly movable spring-pressed chain guide 29 extends along the opposite side of slot 20 and is mounted on the other frame plate 22 for guiding the conveyor run 16.1 of the chain 16 and allowing slight transverse movement thereof in order to accommodate varying thicknesses of bag materials passing between the chains.

Heat transfer bars 11.3 and 12.3 extend along the confronting heat transfer runs 11.1 and 12.1 of the bands to supply, and in some cases withdraw, heat from the bands passing therealong. The bars may be heated by electrical or resistance heaters and may be cooled by chilled water in order to withdraw heat from the seals being formed.

Figure 4:
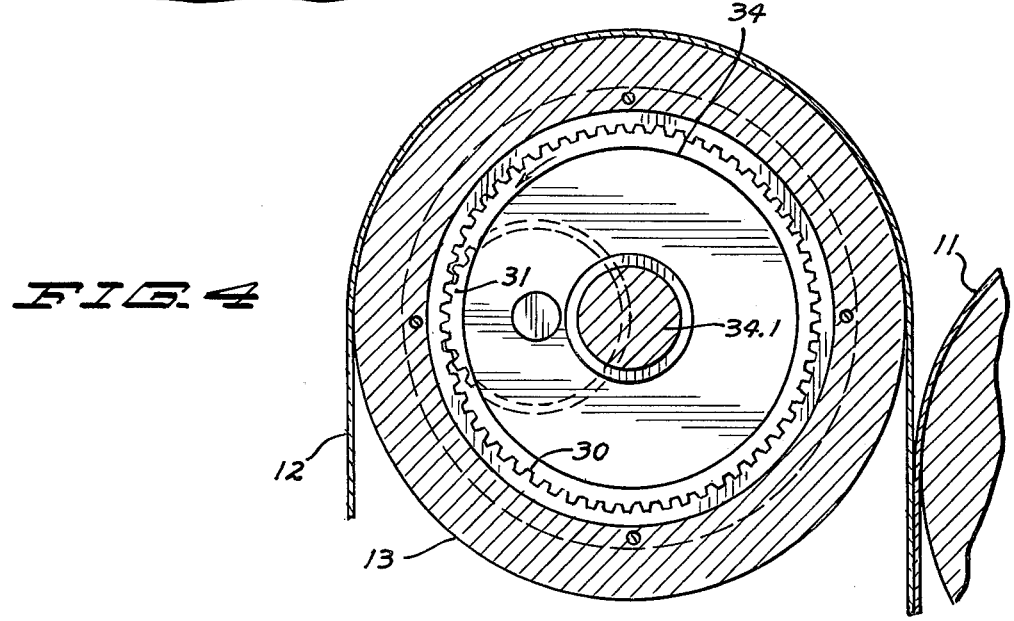
FIG. 4 is a detail section view taken approximately at 4—4 in FIG. 2.

With particular reference to FIGS. 2 and 4, it will be seen that the band wheels 13 are substantially identical to each other, and a description of one will suffice for an understanding of both. Each of the wheels 13 has a top wall 13.1 which incorporates a center hub 13.2 which mounts the bearing 13.3.

The top wall 13.1 defines an outwardly and downwardly obliquely inclined top surface 13.4 extending outwardly to the substantially cylindrical outer peripheral face 13.5. Each of the wheels 13 has a depending peripheral wall 13.6 which defines the peripheral surface 13.5 and also defines a substantially circular interior recess or chamber 13.7. The inner periphery of wall 13.6 has an annular recess or shoulder 13.8 formed therein in which ring gear 30 is affixed as by screws 30.1.

Each of the wheels 13 is driven by a pinion 31 which is affixed on and coaxial with the hub of chain sprocket 32. Pinions 31 are meshed with the respective ring gears 30.

The sprockets 32 are meshed with the return runs 15.2 and 16.2, respectively, of the conveyor chain. The chains are maintained in the proper transverse location for continued meshing with the sprockets 32 by rigid guides 33 affixed to the frame plates 22. The hubs of sprockets 32 mount bearings 32.1 therein.

Mounting brackets 34 are provided beneath wheels 13 for mounting the wheels and also mounting the coaxial pinions 31 and sprockets 32. The mountings 34 define upstanding stub shafts 34.1 extending into the hub 13.2 and bearings 13.3 of the band wheels, and the wheels and bearings are retained on the shafts by suitable retainer rings 34.2. It should be noted that the shafts 34.1 terminate substantially flush with the upper face of the wheels 13 so that there is an open and unobstructed space immediately above both of the band wheels 13 through which the bands 11 and 12 may be moved during mounting of the bands or removal of the bands from the wheels.

The mountings 34 have enlarged recesses 34.3 to receive and confine the pinions 31 and sprockets 32. The brackets 34 have horizontal cantilever portions 34.4 in which depending mounting axles or shafts 35 are affixed which extend downwardly therefrom through the hubs of sprockets 32 and the bearings 32.1 therein.

As best seen in FIGS. 2 and 3, the mounting bracket has an upstanding and generally arcuately shaped mounting portion 34.5 supported on the frame plates 22. Each of the brackets 34 is supported from the adjacent mounting plate 22 by a fulcrum pin 36, and the bracket is affixed to the mounting plate by screws 37 extending upwardly through the mounting plate and threaded into the bracket. By adjusting the screws 37, the bracket may be tilted in either fore or aft direction so as to slightly adjust the orientation of the respective band wheel 13 in order to make the band properly track on the periphery of the wheel.

Figure 5:
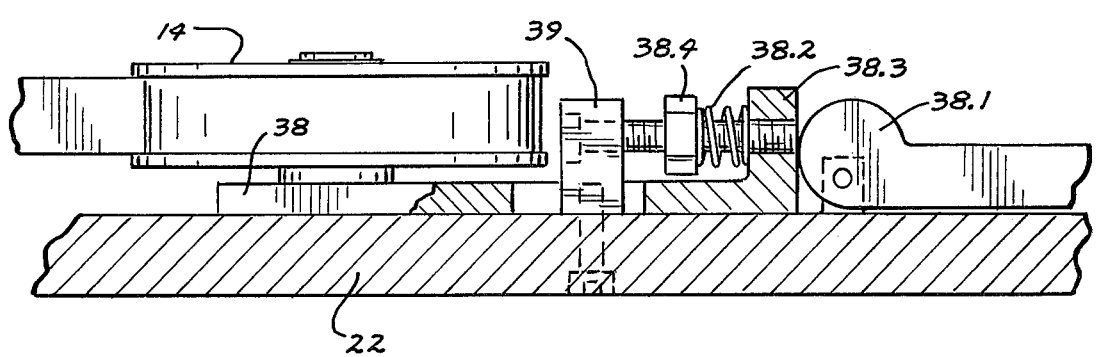
FIG. 5 is an enlarged detail section view taken approximately at 5—5 in FIG. 1.

In order to facilitate removal and application of bands to the wheels, the wheels 14 are slightly movable and, as best seen in FIG. 5, are mounted on a slide 38 which is guided, longitudinally of the machine, on the frame plate 22. The slide 38 is movable by swinging cam 38.1 upwardly and against the upstanding end of the slide and against the pressure of spring 38.2 which bears against the slide at 38.3 and also against an adjustable screw 38.4 which is threaded into a stationary lug 39 affixed to the frame plate 22. By swinging the cam 38.1, the adjacent wheel 14 will move slightly and loosen the band so that one band may be removed and another one applied.

It will be seen that by the novel arrangement of the mounting of the driving band wheels 13, the bands may be readily and easily applied to and removed from the band wheels when the bands are slightly loosened. The space immediately above the driving wheels is open and unobstructed and the band wheels are driven directly from the conveyor chains, the speed of which is accurately coordinated with the rotary speed of wheels 13 and the linear speed of the bands 11 and 12.

What is claimed:

1. In a band sealer, a frame plate having a slot through which the bag top passes for sealing;
   a pair of bag conveyor chains immediately above the frame plate and having conveyor runs confronting each other in closely spaced relation along the slot;
   means including sprockets mounting and driving such chains;
   heat transfer means producing sealing of the bag tops carried by the chains and including a pair of endless heat transfer bands located adjacent and above the chains and having heat transfer runs in confronting and closely spaced relation along the conveyor runs of the chains; and
   means including wheels mounting and driving such bands, one wheel for each band overlying the adjacent chain in closely spaced relation and there being an open and unobstructed space next above the wheel through which an entire band may be moved for application to and removal from the wheels and also including a stationary mounting for the wheel and affixed to the frame plate, said mounting being disposed between the wheel and the frame plate, and coupling means directly connecting each band wheel with the adjacent conveyor chain, said coupling means including a sprocket meshed with said chain, gears driven by said sprocket and driving the band wheel and located beneath the wheel and producing the identical speed in the band and in the chain.

2. In a band sealer, a frame plate having a slot through which the bag top passes for sealing;
   a pair of bag conveyor chains immediately above the frame plate and having conveyor runs confronting each other in closely spaced relation along the slot;
   means including sprockets mounting and driving such chains;
   heat transfer means producing sealing of the bag tops carried by the chains and including a pair of endless heat transfer bands located adjacent and above the chains and having heat transfer runs in confronting and closely spaced relation along the conveyor runs of the chains; and
   means including wheels mounting and driving such bands, one wheel for each band overlying the adjacent chain in closely spaced relation and there being an open and unobstructed space next above the wheel through which an entire band may be moved for application to and removal from the wheels and also including a stationary mounting for the wheel and affixed to the frame plate, said mounting being disposed between the wheel and the frame plate, and coupling means directly connecting each band wheel with the adjacent conveyor chain, each of said band wheels including a ring gear, and cooperating sprockets and pinions beneath the wheels and journaled on said stationary mounting and driving the ring gears and wheels from the conveyor chain.

3. The invention according to claim 2 and each of the wheels having an outwardly and downwardly inclined upper face adjacent the periphery to quickly guide the band downwardly onto the peripheral surface of the wheel.

4. In a band sealer wherein a superposed sealing band and driven conveyor chain overlie a slotted frame plate through which a bag top passes for sealing;
- a band mounting and driving wheel for each of the bands and disposed above the adjacent chain, the wheel having an upper wall defining a mounting hub and a downwardly and outwardly inclined top surface, the wheel also having a depending peripheral wall defining a substantially cylindrical band mounting outer periphery and also defining a downwardly opening interior recess and an inner periphery on which a ring gear is affixed;
- driving means at each band wheel and including a pinion and a sprocket affixed together in coaxial relation, the sprocket meshed with the adjacent chain and the pinion meshed with the ring gear of the wheel; and
- mounting means for each wheel and the adjacent coaxial pinion and sprocket and including an upright mounting bracket extending upwardly into the interior recess of the wheel and having an upstanding stub shaft upon which the wheel is journaled, the bracket also having a cantilever portion from which a downwardly extending pinion and sprocket mounting axle is suspended in fixed position.

* * * * *